Patented Oct. 2, 1951

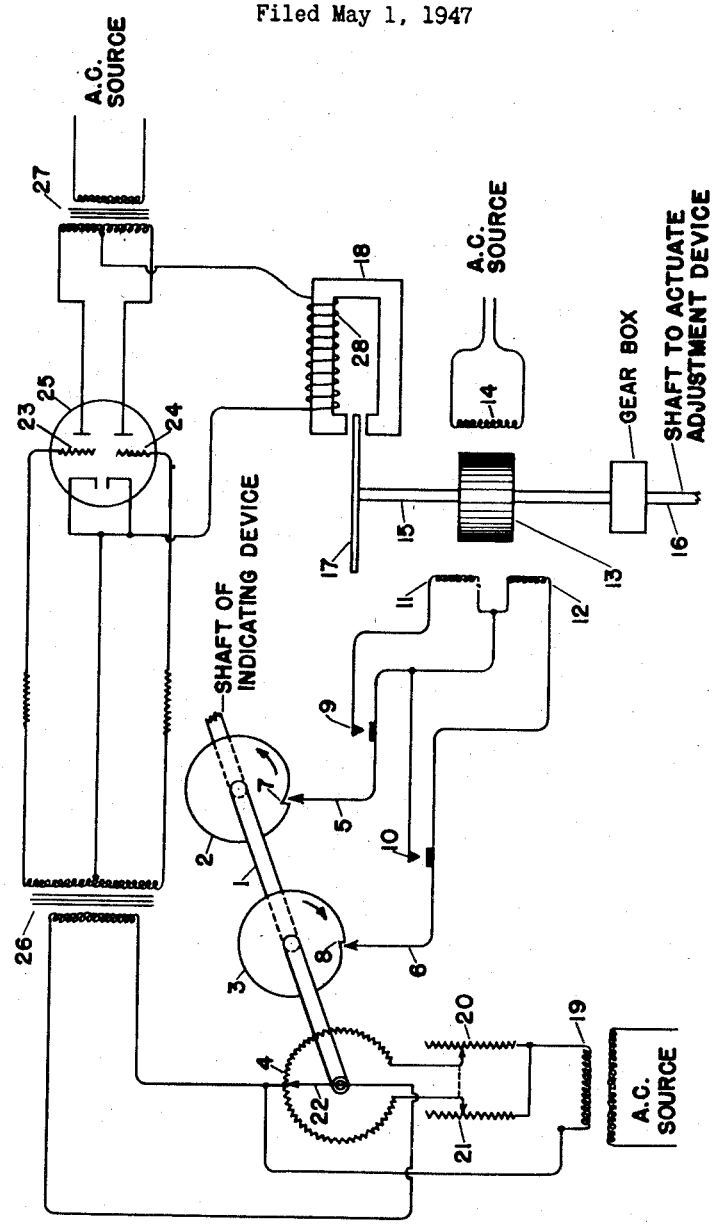

2,569,456

UNITED STATES PATENT OFFICE 2,569,456

CONTROL DEVICE

Russell E. Cushing and Ross L. Swenson, Wyandotte, Mich., assignors to The Pennsylvania Salt Manufacturing Company, Philadelphia, Pa., a corporation of Pennsylvania Application May 1, 1947, Serial No. 745,300

6 Claims. (Cl. 318—382)

This invention relates to a floating action automatic controller and its application to industrial processes. The principal terms used in this application in describing the details of our controlling means are used in the sense in which they have been defined by the Terminology Committee of The American Society of Mechanical Engineers, as published in the periodical Mechanical Engineering for February 1946.

In industrial processes it is common to control such variable conditions or characteristics as voltage, current, power, temperature, pressure, flows, speed, viscosity, specific gravity, hydrogen ion concentration, position, and the like, by automatic means in which deviation of the variable concerned from a predetermined set point is detected by some measuring means which actuates a control mechanism by which an adjusting device is moved to effect a change in value of the characteristic under control and bring it back to its set point. In the devices heretofore in use, various means, such as proportional-speed floating action devices, have been employed to reduce cycling. In all prior devices, however, the means employed to avoid cycling either results in making the actuation of the adjustment device in response to the deviation of the characteristic under control undesirably sluggish or has involved the use of complex mechanisms or fragile elements which in plant use are readily subject to mechanical misadjustment or failure and are otherwise unsatisfactory.

We have now developed a controlling means of relatively simple and sturdy construction in which the final control element that effects the desired change in the value of the variable under control to the desired value is rapidly actuated in response to a deviation of this variable, with no cycling or a minimum of cycling. The controlling means of our invention includes an initial control element associated through a plurality of electric circuits with a movable final control element, for example a motor, which by its motion effects a change in the value of the variable under control, the initial control element being responsive to deviations of the controlled variable from a set point, and acting through one of the electric circuits associating it with the final control element to move the final control element in one direction for a deviation of the control variable beyond a neutral range or neutral point in the one direction and acting to move the final control element in an opposite direction for a deviation of the control variable beyond the neutral range or neutral point in the opposite direction, the initial control element being associated through another electric circuit to an electrically energized restraining mechanism arranged to control the rate of motion of the final control element in accordance with the energization of the restraining mechanism (for example, arranged to apply a variable braking action to a control motor), the amount of electrical energy furnished to the restraining mechanism varying with the magnitude of the deviation, in either direction, of the controlled variable from its desired value.

By use of our controlling means, any of the variable conditions or characteristics, as abovelisted, may be maintained at a desired value, i. e. a set point or neutral range, without cycling. Specific examples of the process of our invention, employing our controlling means will be hereinafter mentioned.

A preferred embodiment of our invention will be described in connection with the accompanying drawing, which shows in diagrammatic form for purposes of illustration one type of control device coming within the scope of our invention.

In the drawing reference numeral 1 indicates the shaft of a detector means which by rotation in one direction or the other shows a deviation of the characteristic under control from a set point. For example, the variable under control may be the current from a D. C. generator (not shown on the drawing) or the rate of flow of a fluid, or other variable. In the case of a D. C. generator, for example, an accurate indication of the current may be obtained from a selfbalancing potentiometer connected across a shunt in the line from the generator. Such a potentiometer generally has an indicating pointer showing the value of the current at all times.

In the embodiment illustrated in the drawing, the shaft 1 may conveniently be the same shaft which carries the slide wire of the selfbalancing potentiometer, in the case of controlling generator current.

Also mounted on the shaft 1 are the cams 2 and 3 and a center tapped potentiometer 4 carried on the periphery of a disc mounted on the shaft 1. The cam 2 has riding on its periphery the element 5 of a switch and on the periphery of the cam 2 is a means 7, which when the shaft is in set point position is located a slight distance in a counter-clockwise direction from the switch element 5. Upon rotation of the cam 2 in the direction indicated by the arrow, the means 7 trips the switch element 5 and closes the switch 9. The cam 3 similarly has riding on its periphery the switch element 6 and on the periphery of this cam, located a slight distance in a clockwise direction from the switch element 6 when the shaft 1 is in its set point position, is a mechanism 8 capable of tripping the switch element 6, when cam 3 is rotated in the direction thereon indicated. The tripping of switch element 6 will close the switch 10. Rotation of the cam element 7 past the switch element 5 or rotation of cam element 8 past the switch element 6 in the reverse direction to that discussed opens the switch 9 or the switch 10, respectively. Accordingly, when shaft 1 is in its set point position, both switch 9 and switch 10 are open, whereas a very slight rotation of the shaft 1 in either direction closes either switch 9 or switch 10. Thus, depending upon the settings of elements 5, 6, 7 and 8, there may be provided a more or less narrow neutral range of values for the controlled variable, which may, if desired, be diminished substantially to a point.

The closing of switch 9 short-circuits the shading coil 11 whereas the closing of switch 10 short-circuits the shading coil 12. 11 and 12 are the two sets of shading coils found in the conventional reversible shaded pole motor whose rotor is indicated in the drawing by the reference numeral 13, and whose field is indicated by the reference numeral 14. As is well known, the short-circuiting of one of the shading coils causes the motor to rotate in one direction whereas the short-circuiting of the other shading coil causes the motor to rotate in the other direction. Thus, rotary displacement of the shaft 1 in one direction, from the set point to the trip point, always results in rotation of the shaded pole motor in a particular direction, whereas similar rotary displacement of the shaft 1 in the opposite direction causes rotation of the shaded pole motor in the opposite direction.

The shaft 15 of the reversible motor carries a copper disc 17 which is mounted to rotate in the path of the magnetic circuit of the electro-magnet 18. The shaft 15 is also connected through suitable reduction gearing with the shaft 16.

The shaft 16 may be connected directly to an adjustment device. For example, where the current from a D. C. generator is being controlled, shaft 16 may actuate a variable rheostat which controls the current in the field circuit of the generator, or may actuate a phase shifting device which varies the output of a thyratron energized by an A. C. source; such a thyratron furnishes D. C. which is applied to the field of the generator whose output current is being controlled. Or, when flow is being controlled, shaft 16, through suitable gearing, may be directly connected to a valve stem.

The center tapped potentiometer 4 carried by the shaft 1 is energized by the secondary 19. One end of the secondary 19 is connected to the center point of the potentiometer 4 whereas the other end of the secondary 19 is connected through variable resistances 20 and 21 to each end of the potentiometer 4.

The fixed contact 22 for the potentiometer 4 is mounted so that when the shaft 1 is in its set point position, it is in contact with the center point of the potentiometer. Rotary displacement of the shaft 1 causes a corresponding rotary displacement of the center point of the potentiometer from the contact 22, either in one direction or the other.

In the circuit illustrated, the grids 23 and 24 of the twin triode 25, are both energized from the potentiometer 4 by means of the transformer 26. The plate voltage for both plates of the triode 25 is furnished from the A. C. source through the transformer 27 by connecting each anode to a terminal of the secondary of this transformer and completing the circuit between anode and cathode through a center connection to the secondary of the transformer 27.

The terminals of transformers 19, 26 and 27 are connected in such manner that as each plate of the double triode 25 becomes positive the associated grid 23 or 24 is caused to receive a potential between zero and a high negative value, the value depending upon the position of the slider on the potentiometer 4. This potential shall hereinafter, in the specification and claims, be referred to as "negative bias." The farther the contact 22 is displaced from the center point of the potentiometer 4, the greater is the negative grid bias on whichever side of the triode 25 is operating. The plate circuit from each side of the twin triode 25 passes through the coil 28 of the electro-magnet 18. The triode 25 thus, in the illustrated device, acts as a full wave rectifier, besides acting to modulate the energy furnished to coil 28 in accordance with variations in the potential supplied by potentiometer 4. That is, since the plate circuit current is greatest when the negative bias on the grid is least, the energy furnished the electro-magnet 18 is at its greatest when the contact 22 is at the center point of the potentiometer 4 and conversely the energy furnished the electro-magnet 18 becomes progressively less as the contact 22 is displaced from the center of the potentiometer 4 in either direction.

The magnetic flux of the electro-magnet 18 passes through a portion of the copper disc 17, and when this disc is in motion, acts as an electro-magnetic brake. It will thus be seen that this braking action on the moving disc 17 is at its greatest when the contact 22 is at the center point of potentiometer 4 and the braking action on the moving disc 17 becomes progressively less as the contact 22 is displaced in either direction from the center point of the potentiometer 4.

In the illustrated embodiment of our invention, the shaft 1 and the devices mounted thereon may be looked upon as the initial control element of our controlling means. The shaded pole reversible motor and the means it sets in motion to alter the value of the variable under control, may be looked upon as the final control element.

The particular arrangement illustrated in the drawing may, of course, be modified in many ways. In the arrangement illustrated, an A. C. source (which is the same source in each case) is shown supplying energy to the transformer 19, the transformer 27 and the shaded pole motor. By revising the wiring somewhat (i. e. by eliminating the transformers, energizing both the triode and the potentiometer 4 from a suitable direct current source, by utilizing a reversible direct current motor and by other obvious minor changes) the entire control means could be operated from a direct current. Also, it would be possible to employ the potentiometer 4 as a simple rheostat in a direct current circuit that included the coil 28, without the electron tube, the circuit being so arranged that when the shaft 1 is in set point position, the minimum resistance is included in the circuit and therefore the maximum energy is furnished to coil 28.

Similarly, other mechanisms than the cams 2 and 3 actuating the shaded pole reversible motor are known in the art for actuating a control device reversibly in response to deviations of the controlled variable and any such means can be substituted for the one illustrated, by suitable modification, and remain within the scope of our invention. For example, any motor capable of being reversed by simple switching mechanism can replace the shaded pole motor, and for the switching mechanism we may employ magnetic or electronic relays, suitably placed photoelectric tubes and associated circuits, or the like. Also other moveable final control elements than reversible motors are known in the automatic control art and can be applied in the device and method of our invention. The electro-magnetic brake can be applied to the control motor or other movable control device by other means than the braking effect of magnetic flux on a moving copper disc. For example, an aluminum disc can be used or an electro-magnetically operated brake shoe applied directly to a fly wheel of the motor can be employed.

As above stated a device of this type is suitable for control of any variable condition or characteristic whose instantaneous value is detectable by instruments, e. g. the primary element and associated elements of a measuring means. For example, variations in rate of flow of a fluid are detectable by a manometer whose moving parts may vary the resistance in the circuit of a self-balancing Wheatstone bridge, and the shaft of this instrument may be the shaft 1 of the illustrated device. The control motor of the illustrated device may then actuate a valve to control the fluid flow.

As another example, variations in temperature of a furnace may be detected by a thermocouple; the thermocouple may be connected to a self-balancing potentiometer as described in connection with the illustrated device, and thus to the control means illustrated. The temperature may finally be regulated by controlling the current through electrical heating elements. Such current control could be effected by a rheostat, induction regulator, grid-controlled thyratron equipped with phase shifting device, or the like, any of these devices being moved by the movable final control element described in the illustrated apparatus.

Similarly, changes in concentration or other characteristics of a material being processed, as detected by any of the known instruments for this purpose, based, for example, on changes in conductivity, dielectric qualities, or other electrical characteristics, and indicated, for example, by a self-balancing potentiometer, may be controlled through our device and by our method, by suitably connecting our initial control element to such detecting instrument, and by suitable connection from our final control element to the valves, rheostats or other devices that set in motion the necessary changes to alter the quality of the material in process.

Since many modifications are possible in the apparatus and method of process of our invention as above described without departure from the scope of the invention, it is intended that the above description of our invention should be interpreted as illustrative, and the invention is not to be limited except as set forth in the claims which follow.

We claim:

1. In a floating action automatic controller, a controlling means that comprises an initial control element associated through a plurality of electrical circuits with a final control element capable of motion, the initial control element being responsive to deviations of the controlled variable from a set point and being equipped with trip mechanisms to modify electrical characteristics of electrical circuits associating the initial and final control elements, said modifications having opposite effects for opposite deviations of the controlled variable from its set point, so as to move the final control element in one direction for a deviation of the controlled variable beyond said set point in the one direction, and to move the final control element in an opposite direction for a deviation of the controlled variable beyond the set point in the opposite direction, the initial control element being further associated with a potentiometer connected to apply a blocking bias to the grid of an electron tube, the amount of said bias being least when the initial control element is at the position corresponding to the set point of the controlled variable, and said bias becoming increasingly greater as the controlled variable departs further, in either direction, from the set point, the plate circuit from said electron tube being connected to energize an electromagnetic brake arranged to reduce the rate of motion of the final control element in accordance with the energization of the brake, whereby the braking action varies with the magnitude of the deviation, in either direction, of the controlled variable from its set point.

2. In a floating automatic controller for maintaining a controlled variable within a predetermined range, an initial control element actuated in response to variations of said variable, an initial set point for said initial control element, a predetermined range of movement including said set point for said initial control element corresponding to the variation of said variable throughout the predetermined range, a final control element adapted through its operation to change said variable, driving means for moving said final control element, an electric control circuit connecting said initial control element with said driving means to fully energize said driving means on departure of said variable from said predetermined range to return said variable to within said range, braking means for restraining the movement of said final control element, an electric control circuit connecting said initial control element with said braking means to control the energization of the same in accordance with the position of said initial control element, said circuit containing a potentiometer, a source of potential for said potentiometer, a pointer carried by said first element adapted to ride on said potentiometer to unbalance said potentiometer when said initial control element departs from said initial set point to provide a controlling potential to vary the amount of electric energy received by said braking means in accordance with the amount of departure of said initial control element from said initial set point.

3. In a floating automatic controller for maintaining a controlled variable within a predetermined range, an initial control element actuated in response to variations of said variable, an initial set point for said initial control element, a predetermined range of movement including said set point for said initial control element corresponding to the variation of said variable throughout the predetermined range, a final control element adapted through its operation to change said variable, an electric motor for driving said final control element, an electric circuit for energizing said motor, switching means in said circuit for controlling the energization of said motor and the direction of rotation thereof, adjustable switch actuating means carried by said initial control element adapted to operate said switching means to fully energize said motor and cause its rotation in one direction on movement of said initial control element to the limit of said predetermined range in one direction and to operate said switching means to fully energize said motor and cause its rotation in the opposite direction on movement of said initial control element to the limit of said predetermined range in the opposite direction, a magnetic brake for restraining the movement of said final control element in accordance with the energization of said brake, a second circuit associating said initial control element with said magnetic brake to vary the amount of energy received by said brake in accordance with the magnitude of the deviation of said initial control element from said initial set point said circuit comprising a first alternating current source, a potentiometer energized from said first alternating current source, a second alternating current source of equal phase to said first source, an electron tube adapted to pass current from said second source to said magnetic brake, a movable contact riding on said potentiometer the position of said contact controlling the balance or unbalance of said potentiometer said contact adapted to move with said initial control element to balance said potentiometer when said initial control element is at said initial set point and to unbalance said potentiometer when said initial control element has moved from said initial set point the amount of said unbalance being proportional to the degree of departure of said initial control element from said initial set point, and electric coupling means electrically connecting said potentiometer and said electron tube to place a blocking bias on said tube to control the current flow through said tube to said magnetic brake said blocking bias being proportioned to the unbalance of said potentiometer.

4. In a floating automatic controller for maintaining a controlled variable at a predetermined value, a first element actuated in response to variations of said variable from said predetermined value, a second element adapted through its operation to change said variable, a motor for driving said second element, an electric control circuit connecting said first element to said motor for controlling the movement of said motor and said second element, means carried by said first element acting on said circuit to fully energize said motor to cause movement of said second element in one direction on deviation of said variable from said predetermined value in one direction and to fully energize said motor to cause movement of said second element in the opposite direction on deviation of said variable from said predetermined value in the opposite direction, said second element being stationary except when moved in either one or the opposite direction in response to movement of said first element, a magnetic brake arranged to control the rate of motion of said second control element in accordance with the energization of said brake and a second electric circuit associating said first control element with said magnetic brake said second electric circuit containing a potentiometer having adjustable impedance arms, a source of potential for said potentiometer, a pointer carried by said first element adapted to ride on said potentiometer to unbalance said potentiometer when said controlled variable departs from said predetermined value to provide a controlling potential to vary the amount of electric energy received by said magnetic brake in accordance with the magnitude of the deviation of the controlled variable from said predetermined value.

5. In a floating automatic controller for maintaining a controlled variable at a predetermined value, a first element actuated in response to variations of said variable from said predetermined value, a second element adapted through its operation to change said variable, a motor for driving said second element, an electric control circuit connecting said first element to said motor for controlling the movement of said motor and said second element, means carried by said first element acting on said circuit to fully energize said motor to cause movement of said second element in one direction on deviation of said variable from said predetermined value in one direction and to fully energize said motor to cause movement of said second element in the opposite direction on deviation of said variable from said predetermined value in the opposite direction, said second element being stationary except when moved in either one or the opposite direction in response to movement of said first element, a magnetic brake arranged to control the rate of motion of said second control element in accordance with the energization of said brake and a second electric circuit associating said first control element with said magnetic brake said second electric circuit comprising a first alternating current source, a potentiometer energized by said first alternating source, a second alternating current source of equal phase to said first source, an electron tube adapted to pass current from said second source to said magnetic brake, a movable contact riding on said potentiometer the position of said contact controlling the balance or unbalance of said potentiometer said contact adapted to move with said first element to balance said potentiometer when said controlled variable is at the predetermined value and to unbalance said potentiometer when said controlled variable has departed from said predetermined value the amount of said unbalance being proportioned to the degree of departure of said controlled variable from said predetermined value, and electric coupling means electrically connecting said potentiometer and said electron tube to place a blocking bias on said tube to control the current flow through said tube to said magnetic brake said blocking bias being proportioned to the unbalance of said potentiometer.

6. In a floating automatic controller for maintaining a controlled variable within a predetermined range, an initial control element actuated in response to variations of said variable, an initial set point for said initial control element, a predetermined range of movement for said initial control element corresponding to the variation of said variable throughout the predetermined range, a final control element adapted through its operation to change said variable, driving means for moving said final control element, an electric control circuit connecting said initial control element with said driving means to fully energize said driving means on departure of said variable from said predetermined range to return said variable to within said range, braking means for restraining the movement of said final control element, a second electric circuit associating said initial control element with said braking means, a controller in said second electric circuit, said controller contains a balanced circuit network which when in balance permits a maximum flow of current to said braking means and which when out of balance decreases the flow of current to said braking means in an amount proportional to the amount of unbalance, and means carried by said initial control element operating on said balanced circuit to effect the balance of the same on departure of said initial control element from said predetermined point to continuously decrease the energization of said braking means in amounts proportional to the amount of departure of said initial control element from said set point.

RUSSELL E. CUSHING.
ROSS L. SWENSON.

REFERENCES CITED

The following references are of record in the file of this patent:

UNITED STATES PATENTS

| Number | Name | Date |
| --- | --- | --- |
| 1,924,459 | Ryder | Aug. 29, 1933 |
| 2,112,682 | Ryder | Mar. 29, 1938 |
| 2,184,576 | Beyerle | Dec. 26, 1939 |
| 2,275,317 | Ryder | Mar. 3, 1942 |
| 2,302,889 | Reed | Nov. 24, 1942 |
| 2,367,746 | Williams, Jr. | June 23, 1945 |

FOREIGN PATENTS

| Number | Country | Date |
| --- | --- | --- |
| 444,673 | Great Britain | Mar. 14, 1935 |